（12）United States Patent
King et al.

(10) Patent No.: US 10,970,465 B2
(45) Date of Patent: Apr. 6, 2021

(54) WEB PAGE MANIPULATION (71) Applicant: HEWLETT PACKARD ENTERPRISE DEVELOPMENT LP, Houston, TX (US)

(72) Inventors: Brian Charles King, Alpharetta, GA (US); Thomas Christopher Swedlund, Alpharetta, GA (US); Christian Attila Szabo, Alpharetta, GA (US)

(73) Assignee: Micro Focus LLC, Santa Clara, CA (US)

( * ) Notice: Subject to any disclaimer, the term of this patent is extended or adjusted under 35 U.S.C. 154(b) by 502 days.

(21) Appl. No.: 15/246,266

(22) Filed: Aug. 24, 2016

(65) Prior Publication Data

US 2018/0060283 A1    Mar. 1, 2018

(51) Int. Cl.
*G06F 40/117*    (2020.01)
*G06F 11/36*    (2006.01)
*G06F 16/957*    (2019.01)
*G06F 40/14*    (2020.01)
*H04L 12/24*    (2006.01)
*H04L 29/08*    (2006.01)

(52) U.S. Cl.
CPC ........ *G06F 40/117* (2020.01); *G06F 11/3696* (2013.01); *G06F 16/957* (2019.01); *G06F 40/14* (2020.01); *H04L 41/0233* (2013.01); *H04L 67/02* (2013.01); *G06F 11/3672* (2013.01)

(58) Field of Classification Search
None
See application file for complete search history.

(56) References Cited

U.S. PATENT DOCUMENTS

| 7,765,597 | B2 | 7/2010 | Sima et al. |
| 8,136,109 | B1 * | 3/2012 | Birdeau .................. G06F 8/24 715/760 |
| 8,868,533 | B2 | 10/2014 | Powell et al. |
| 9,015,832 | B1 | 4/2015 | Lachwani et al. |
| 9,276,952 | B2 | 3/2016 | Simpson et al. |
| 9,355,082 | B2 * | 5/2016 | Jitkoff .................. G06F 1/3203 |

(Continued)

OTHER PUBLICATIONS

Mesbah, A., et al., "Crawling Ajax-Based Web Applications Through Dynamic Analysis of User Interface State Changes," ACM Transactions on the Web (TWEB), 6.1, Mar. 2012, 30 pages.

(Continued)

*Primary Examiner* — Howard Cortes (57) ABSTRACT

Examples relate to manipulating web pages. In one example, a computing device may: receive a web page that includes application instructions for modifying objects included in the web page; execute the application instructions; record, in an ordered list of changes, change data for each application object that is modified, created, or destroyed during execution of the application instructions; record, in the ordered list of changes, change data for each web page object that is modified, created, or destroyed during execution of the application instructions; identify, in the ordered list of changes, a transition point between recorded changes; receive a request to change a state of the web page to the transition point; and apply, in reverse order, an inverse of each change specified in the ordered list of changes from a current point in time until the transition point.

20 Claims, 5 Drawing Sheets

(56) References Cited

U.S. PATENT DOCUMENTS

| | | | |
|---|---|---|---|
| 2005/0081105 A1* | 4/2005 | Wedel | G06F 9/451 714/38.14 |
| 2005/0187970 A1 | 8/2005 | Goodwin et al. | |
| 2008/0148189 A1* | 6/2008 | Szent-Miklosy | G06F 3/0481 715/848 |
| 2009/0013244 A1* | 1/2009 | Cudich | G06F 17/21 715/234 |
| 2009/0100154 A1* | 4/2009 | Stevenson | G06Q 30/02 709/220 |
| 2010/0251143 A1* | 9/2010 | Thomas | G06F 17/3089 715/760 |
| 2010/0318892 A1* | 12/2010 | Teevan | G06F 17/3089 715/229 |
| 2012/0036264 A1* | 2/2012 | Jiang | G06F 17/30902 709/226 |
| 2013/0227397 A1* | 8/2013 | Tvorun | G06F 17/227 715/235 |
| 2014/0108917 A1* | 4/2014 | Style | G06F 17/30492 715/234 |
| 2014/0289645 A1* | 9/2014 | Megiddo | G06F 3/048 715/753 |
| 2014/0298159 A1* | 10/2014 | Kim | G06F 17/30994 715/234 |
| 2015/0227533 A1* | 8/2015 | Goldstein | G06F 17/30377 707/661 |

OTHER PUBLICATIONS

Addy Osmani: Detect, Undo and Redo DOM Changes With Mutation Observers; Jun. 4, 2014 (Jun. 4, 2014), XP055420340, Retrieved from the Internet: URL:https://addyosmani.com/blog/mutation-observers; [retrieved on Oct. 31, 2017] (18 pages).

Andrea Walther; Program Reversals for Evolutions With Non-Uniform Step Costs, Revised version: Oct. 13, 2003 (21 pages).

Andrea Walther; Program Reversals for Evolutions With Non-Uniform Step Costs, Revised version: Oct. 13, 2003, pp. 235-236.

EPO Search Report; EP Application 17187435.7-1871; dated Nov. 16, 2017; 13 pages.

Vilk et al: A Gray Box Approach for High-Fidelity, High-Speed Time-Travel Debugging; University of Massachusetts Amerherst, Harvard University, Microsoft Research; Jun. 1, 2016 (14 pages).

\* cited by examiner

WEB PAGE MANIPULATION

BACKGROUND

Web pages often include application instructions, such as scripts, for performing a variety of actions. Some web pages, such as those referred to as single page applications (SPAs), often use application instructions for implementing many features on a single web page. For example, an HTML page may include application script for displaying interactive content that can change the structure of the HTML and/or the state of the displayed content.

BRIEF DESCRIPTION OF THE DRAWINGS

The following detailed description references the drawings, wherein.

DETAILED DESCRIPTION

While application instructions may provide web pages with a variety of features, the additional functionality and expanded scope may increase the complexity of indexing and/or testing these types of web pages. For example, the variety of potential changes that may occur in some web pages that use application instructions may greatly increase the computing resources and time spent on testing these web pages.

To facilitate various web page related tasks—such as testing or indexing—the scope of a web page that implements application instructions, such as scripts, may be captured by tracking changes to the web page that occur during loading of and interaction with the web page. As changes to application objects and objects defined by the web page's document object model (DOM) occur, the changes may be stored in a list of changes. In some implementations, transition points may be inserted into a list of changes as bookmarks for manipulating the state of the web page and the state of the application. For example, a transition point may be inserted into a list of changes after a web page and application instructions are fully loaded by a client's web browsing application and/or in response to certain types of user input or changes to the web page's DOM. A web page manipulation device may use the list of changes to change the state of the web page on demand, by either forward-applying changes from a particular point in time or by inversely applying changes to rewind the state of a web page and the application.

By way of example, a micro-blog web page may include script used to modify the web page, e.g., by using user input to change the header, title, or background of the web page or adding, changing, or removing micro-blog posts, images, or other content. A web page manipulation device may be used to test the web page, e.g., using a headless web browser or other web browser to run the web page and track changes throughout the script execution and for various types of user input. For example, a web page manipulator may load the micro-blog web page in a headless browser, tracking the DOM objects and application objects that are created during the loading of the web page and initial execution of the script included in the web page.

For each change, the web page manipulator may store, in a list of changes, each of the changes for the web page and application objects. The initial loading of the web page, for example, may include the creation of many DOM and application objects. In some situations, the application may make further changes after the initial loading of the web page, and the changes to application and web page objects will continue to be recorded. In some implementations, user input may cause changes to web page and application objects, including creating and deleting objects. User input may be, for example, a pointer movement, a click, keyboard input, interaction with a UI element included in the web page, etc., and the input may be provided by a user or simulated. The changes that are caused by user input may also be recorded in the ordered list of changes in the order that the changes take place. For example, a user may click on a UI button to create a new micro-blog post, which may cause a text-box element to be displayed, which the user may input text into before pressing another UI button to submit or post the micro-blog to the web page. Each of the foregoing may be associated with one or more changes to the web page DOM and/or the application, including the change or creation of web page objects and/or application objects.

In some implementations, transition points may be inserted into the ordered list of changes for the web page. The transition points may be placed in a variety of ways, e.g., periodically based on time, at points in time where web page and application execution are idle waiting for user input, and/or in response to the occurrence of specific events or changes to a specific object or objects. Transition points may bookmark a particular state of a web page for later use in web page state manipulation.

The web page manipulator may use the ordered list of changes to change the state of the web page. To revert a web page to a previous state, the web page manipulator applies, in reverse order, the inverse of each change in the ordered list of changes until a specified point. Using the micro-blog post example, the various changes, creations, and deletions of application and web page objects that occurred during the creation of a new micro-blog post may be reversed, e.g., by destroying any DOM or application objects that were created, reverting any of the changes to the objects, and creating any objects that were destroyed when the micro-blog post was made. The changes in the ordered list of changes may also be applied in order, in a manner designed to take the web page from one state to another, e.g., to re-create the micro-blog post again after its creation was reverted. In implementations where transition points are used, the transition points may serve as bookmarks for various states of the web page, allowing a user to transition between the various states using the web page manipulator to apply or revert the changes to get from one state of the web page to another.

The ability to manipulate the state of a web page in the manner described above may facilitate a variety of tasks, such as web page testing or indexing. Inversely applying changes to revert web page state obviates the need to reload a web page to reset web page and application objects and also allows transitioning to multiple states rather than resetting a web page to its default on-load state. These features may reduce client-server communications and computing resources used to manipulate a web page, e.g., when performing many tests on many different attack surfaces of a web page and its included application. Further details regarding the manipulation of web pages are provided in the paragraphs that follow.

Figure 1:
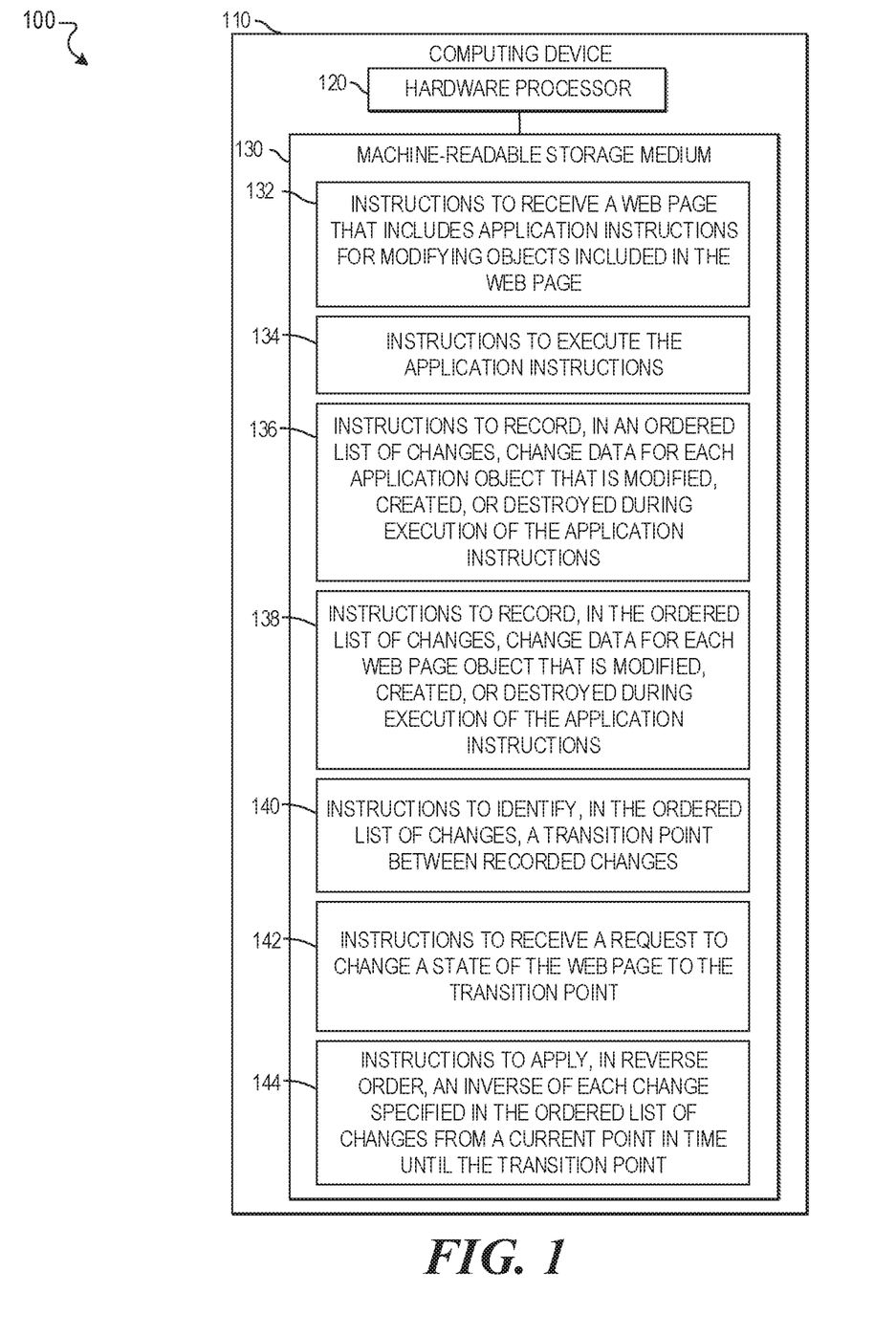
FIG. 1 is a block diagram of an example computing device for web page manipulation.

Referring now to the drawings, FIG. 1 is a block diagram 100 of an example computing device 110 for web page manipulation. Computing device 110 may be, for example, a personal computer, a server computer, a cluster of computers, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-144, to control processes for web page manipulation. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions: 132-144, for manipulating web pages.

As shown in FIG. 1, the hardware processor 120 executes instructions 132 to receive a web page that includes application instructions for modifying objects included in the web page. For example, a web page may represented by a document including HTML code, and the application instructions may be javascript included in and/or referenced by the HTML code. In some implementations, the objects included in the web page may include web objects that are defined by a DOM for the web page, such as HTML elements. In some implementations the objects included in the web page may include application objects, such as javascript variables and data structures.

The hardware processor 120 executes instructions 134 to execute the application instructions. For example, the hardware processor 120 may execute the javascript instructions that were included in the web page. Execution may be performed manually, e.g., using user input, and/or automated, either fully or in part. For example, a test script may cause execution of the application instructions in a particular manner, providing simulated user input. In some implementations, a user may use various user interface elements and input devices to provide input that causes execution of the application instructions. By way of example, a flight booking website may include many user interface elements that are associated with application instructions for performing a variety of functions. Examples may include a date selector box providing a calendar interface for selecting flight dates, a radio button interface element allowing selection of a flight type, a text box allowing the entry of departure and arrival locations that may use an auto-complete suggestion function to suggest a location based on partial input, and a portion of the site may allow a user to obtain automobile rental and/or hotel rental options based on flight information input.

The hardware processor 120 executes instructions 136 to record, in an ordered list of changes, change data for each application object that is modified, created, or destroyed during execution of the application instructions. Using the flight booking website example, a departure date variable and/or departure location variable may be created or modified based on user input. Interaction with a user interface element may also cause changes to application objects, e.g., interaction with a "next" button may cause changes to an object associated with next button. In some implementations, many object changes or creations may occur in response to a single input. The ordered list of changes may track the changes and creations that occur in a chronological order of execution.

The hardware processor 120 executes instructions 138 to record, in the ordered list of changes, change data for each web page object that is modified, created, or destroyed during execution of the application instructions. In the flight booking website example, the DOM for the web page that includes the flight booking application instructions may define the objects included in the page, e.g., the header, body, and various links and user interface elements. During execution of the application instructions, various web page objects may be changed, e.g., a header, title, or text may change in response user interaction, such as a user logging in or providing other input using user interface elements provided by the application instructions.

Object changes may be tracked in a variety of ways. In some implementations, each web page and application object included in a web page and application may be modified by tagging particular properties associated with the object and related to its representation. As an example, a date object may have its representation of the date it stores tagged for tracking. After tagging a property or properties of an object, changes to the property or properties may trigger an event that adds the change to the ordered list of changes.

The actual information included in the ordered list of changes may also vary. In some implementations, the list includes, for each change, an object identifier and—depending on the change—a new and/or old value. For example, newly created objects may not have old values recorded, deleted objects may not have new values, and modified objects may have both a new and an old value. Other information may also be included in the ordered list of changes.

The hardware processor 120 executes instructions 140 to identify, in the ordered list of changes, a transition point between recorded changes. Transition points may be included in the list of recorded changes in a variety of ways. In some implementations, transition points are implicit, rather than explicit, e.g., a transition point may be included implicitly between every recorded change, every n changes, or every n seconds, where n is a positive integer. In some implementations, particular events or changes may trigger the introduction of a transition point. For example, when the web page completes its initial loading, a transition point may be created. When a user interface element is created or destroyed, a transition point may be created in response, e.g., before or after the changes that create/destroy the user interface element. Transition points may also be added by an automated web page test script or created manually by a user.

The hardware processor 120 executes instructions 132 to receive a request to change a state of the web page to the transition point. For example, a user that is testing the web page may, after testing a portion of the application included in the web page, request that the state of the web page be reverted to its state after it initially loaded. Using the flight booking web page example, after providing various input into various user interface elements for testing purposes, a user may wish to revert the changes and try different inputs for further testing.

The hardware processor 120 executes instructions 144 to apply, in reverse order, an inverse of each change specified in the ordered list of changes from a current point in time until the transition point. The inverse, or opposite, of each change may include, by way of example, the deletion of an object that was created, the creation of an object that was deleted, and/or modifying the value of an object from its current value to one or more previous values. Using the flight booking website example, user interaction with a hotel button object may cause a change in the hotel button object, a change to the web page header, and the creation of multiple new objects that enable a user to provide hotel booking information, e.g., hotel booking date, preferred hotel type, hotel location, etc. In a situation where a transition point was established at the state of the web page prior to interaction with the hotel button, the hardware processor 120 may apply the inverse of each of the changes, in reverse order, to change the state of the web page back to the state at the transition point. For example, the hotel button object change may be reverted, the web page header change may be reverted, and the objects that were created for hotel booking information may be deleted.

The number of transition points may vary, and the state of the web page may be changed to any of the transition points in a manner similar to that described above. This may facilitate web page testing, for example, by allowing a tester or automated test script to provide test input that causes changes to web page and/or application objects, and then revert those changes to provide other test input.

In some implementations, the hardware processor 120 may receive a request to change the web page to a second transition point that is listed after the current point in the ordered list of changes. In this situation, the hardware processor 120 may apply, in order, each change specified in the ordered list of changes from the current point in the ordered list of changes to the second transition point. The ability to forward-apply changes may facilitate a variety of functions. Using the web page testing example, a tester or automated test script may request changes be applied in-order, so that the web page may be transitioned to a different state without having to manually provide user input to the web page or application itself.

In some implementations, the ordered list of changes may include branches, allowing for changes to be tracked according to different paths. For example, the ordered list of changes may be represented by a tree of transitions, where different states of the web page and/or application may be represented by nodes, and wherein the edges include the change or changes made during a transition from one state to another. The state of the web page, and its included application, may be changed my forward applying changes to transition forward or by applying the inverse of changes in reverse order to transition backwards in the ordered list of changes.

Figure 2A:
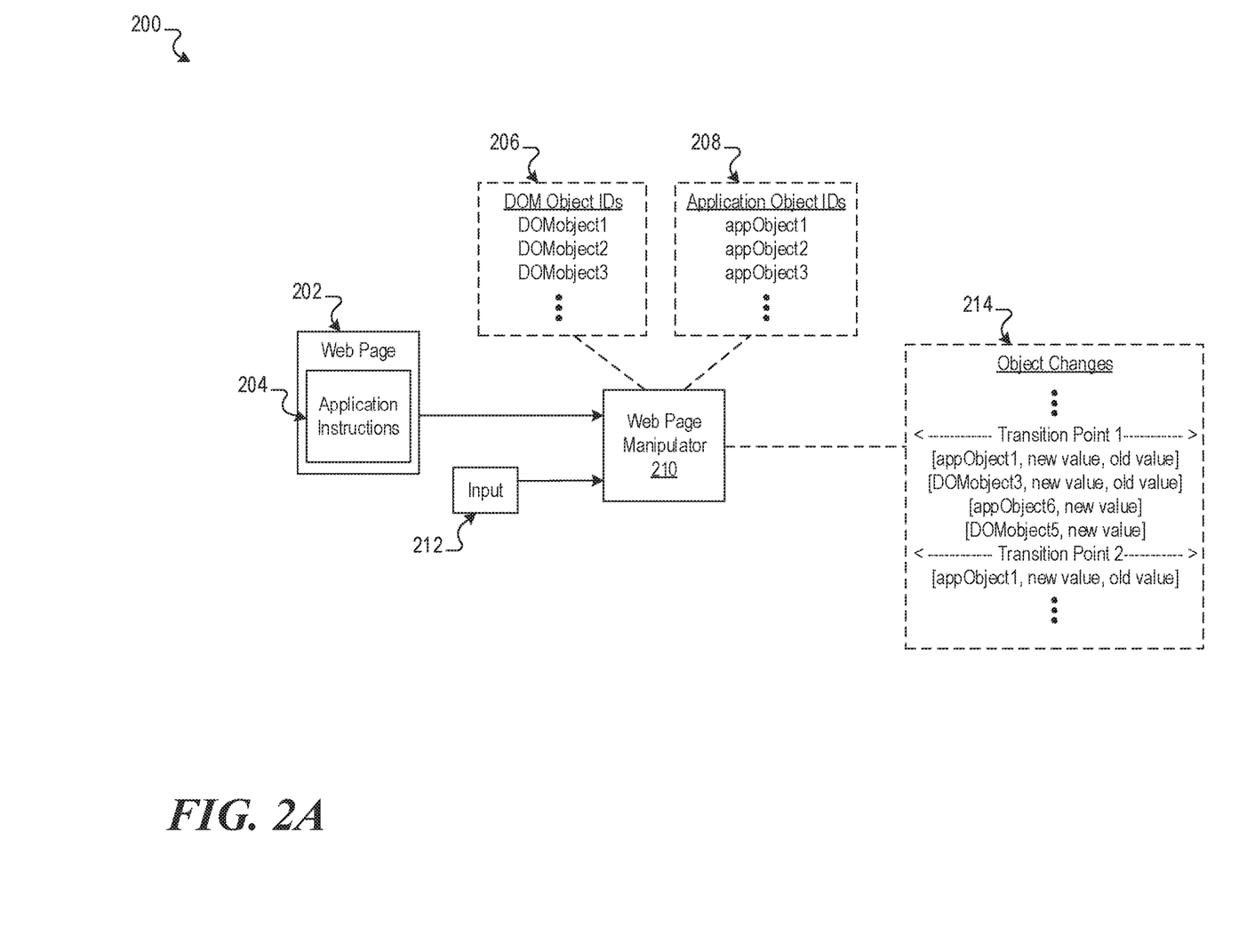
FIG. 2A is a data flow depicting an example of web page change tracking.
Figure 2B:
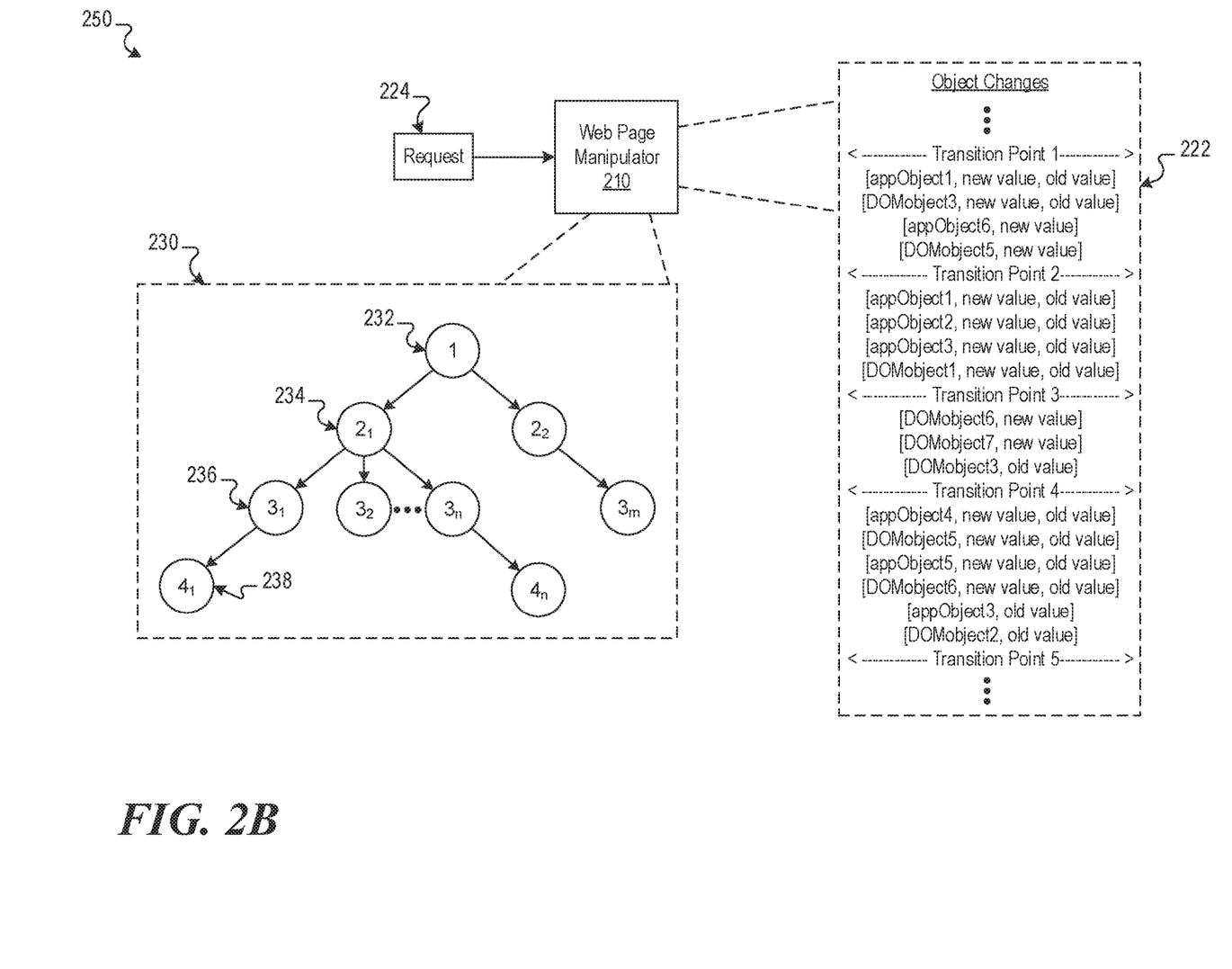
FIG. 2B is a data flow depicting an example of web page manipulation.

FIG. 2A is a data flow 200 depicting web page change tracking, and FIG. 2B is a data flow 250 depicting web page manipulation. The data flows 200 and 250 include a web page manipulator 210 that performs a variety of functions. The web page manipulator 210 may be the same as or similar to the computing device 110 of FIG. 1. Other implementations may include additional devices, such as user/input devices or web servers, which may support tracking web page changes and manipulating web pages.

During operation, the web page manipulator 210 receives a web page 202 that includes application instructions 204. The web page 202 may be acquired in a variety of ways, e.g., provided by another computing device such as a client computing device or server computer.

In the example data flow 200, the web page manipulator 210 tags web page objects 206 that are included in a DOM of the web page 202. In addition, the web page manipulator 210 tags application objects 208 that are included in the application instructions 204. This may be performed prior to execution of web page and/or application instructions, during execution of the web page and/or application instructions, or both. The web page objects 206 are identified with object identifiers, e.g., DOMobject1, DOMobject2, DOMobject3 . . . , and the application objects 208 are identified with application object identifiers, e.g., appObject1, appObject2, appObject3 . . . .

Throughout execution of the web page 202 and application instructions 204, the web page manipulator 210 may receive input 212. Object changes 214 are tracked during the execution, including for the initial loading of the web page 202 and the included application instructions 204. For example, the web page manipulator 210 may load the web page 202 in a headless browser, which may cause various changes to be tracked, e.g., creation of objects, deletion of objects, and other object changes. The initial loading of the web page 202, and tracking of the changes associated with the initial loading, may be performed without input 212.

The input 212 causes one or more changes to the web page objects 206 and/or application objects 208. The change(s) is/are recorded in the ordered list of changes 214. The example ordered list of changes 214 includes, for example, a change to appObject1, which includes the new value and an old value for the object. It also includes changes for DOMobject3, appObject6, DOMobject5, and another change to appObject1. The changes may be any object changes that occurred during execution of the application instructions 204, e.g., variable changes, UI element creations and deletions, and other object changes.

The example ordered list of changes 214 also includes transition points between changes. As described above, the manner in which transition points are introduced into the ordered list of changes 214 may vary. For example, the transition points maybe introduced manually, e.g., by a user or an automated test script that provides the input 212 to the web page manipulator 210. As another example, particular changes or events may trigger the introduction of a transition point by the web page manipulator 210.

The data flow 250 of FIG. 2B depicts an updated list of changes 222 associated with manipulation of the web page 202 and the included application instructions 204. In the example data flow 250, the web page manipulator 210 receives a request 224 to change a current state of the web page 202 to a different state of the web page. For example, the current state of the web page may be at transition point 5 in the ordered list of changes 222. The request 224 may be to change the state to the prior transition point, e.g., transition point 4.

To change the state of the web page 202 from transition point 5 to transition point 4, the web page manipulator applies the inverse of each change to place the web page at the requested state. In the example data flow 250, the changes between transition point 4 and 5 are: modification of appObject4, modification of DOMobject5, modification of appObject5, modification of DOMobject6, deletion of appObject3, and deletion of DOMobject2. Reverse-order application of the inverse of those changes would result in the web page manipulator causing the following changes: creating DOMobject2 using its old value, creating appObject3 using its old value, modifying DOMobject6 from its new value to its old value, modifying appObject5 from its new value to its old value, modifying DOMobject5 from its new value to its old value, and modifying appObject4 from its new value to its old value. By performing these changes, the web page manipulator changes the state of the web page from transition point 5 to the state at transition point 4.

In some implementations, a request 224 may be to change the state of the web page to a later transition point. For example, in a situation where the web page has been transitioned from transition point 5 to transition point 1, a request 224 may cause transition of the web page to transition point 3. To accommodate the request, the web page manipulator would apply, in order, the changes between transition point 1 and transition point 3.

The data flow 250 includes a tree representation 230 of example changes that take place for a web page 202. Each node of the tree may represent a particular state or transition point for the web page and application, and each edge may include data specifying the changes between each state or transition point. As indicated in the example tree 230, many branches may exist for any given web page, and the branches traversed during manipulation of a web page may depend on a variety of things. For example, the first state 232 may be associated with the web page prior to being loaded. The state 234 may represent the state of a web page as initially loaded, and the edge between 232 and 234 may include data specifying the object changes to get from 232 to 234. In this example, state $2_2$ may represent a state associated with a failure to perform the initial loading of the web page. States $3_1$, $3_2$ . . . $3_n$, may be associated with different states that the web page may transition to, e.g., depending on user input. In the flight booking web page example, state $3_1$ 236 may be the state resulting from selecting a departure location, state $3_2$ may be the state resulting from selecting a departure date, and state $3_n$ may be the state resulting from selecting a hotel booking option.

When transitioning between different states, or transition points, the tree representation 230 of the web page changes may facilitate visualizing the various options available. For example, at state $4_1$ 238, the web page manipulator 210 may transition to any other state upon request. To transition to state $2_1$, the web page manipulator 210 may apply, in reverse order, the inverse of the changes that occurred between $4_1$ and $3_1$, and those between $3_1$ and $2_1$. To get from $4_1$ to $3_n$, the above inverse changes may be applied by the web page manipulator 210 and, in addition, the web page manipulator may apply, in order, the changes between $2_1$ and $3_n$. As noted above, the ability to transition to various web page states may facilitate, for example, web page security testing, where a tester may test certain inputs at a particular state, then rewind the changes to test additional input, or test the same input at a different web page state, without requiring the web page to be reloaded.

Figure 3:
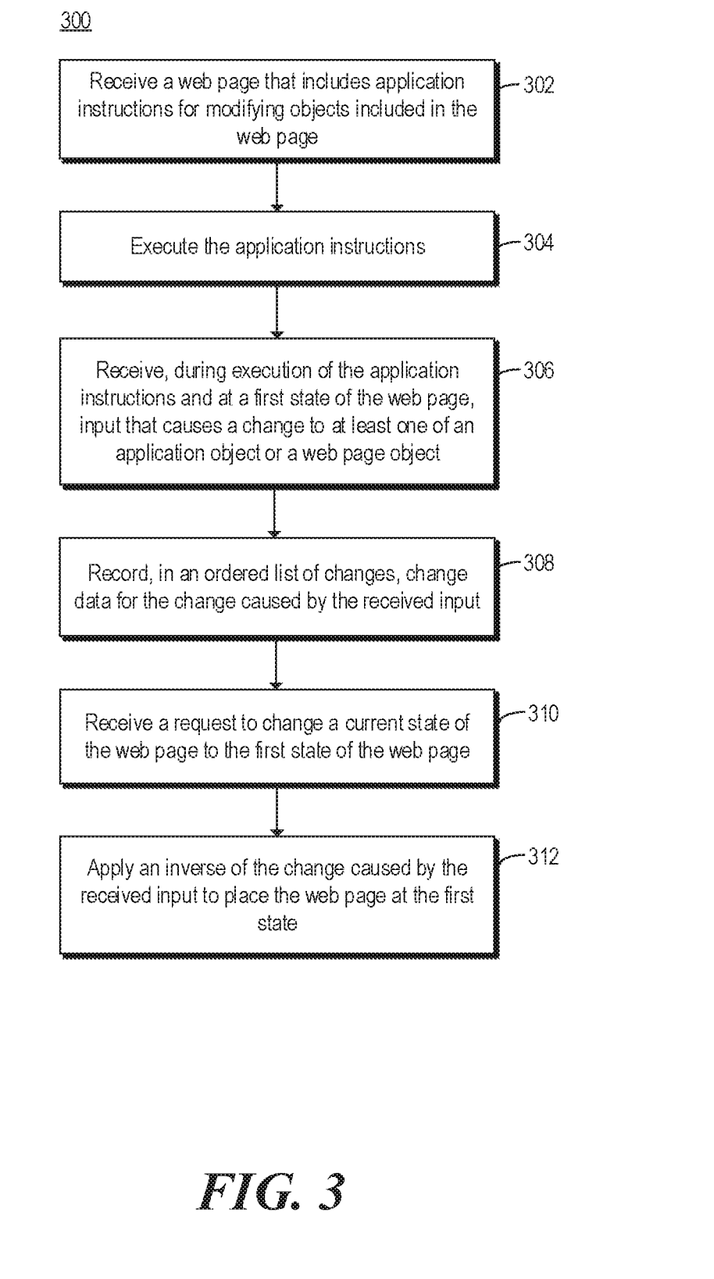
FIG. 3 is a flowchart of an example method for performing web page manipulation.

FIG. 3 is a flowchart of an example method 300 for performing web page manipulation. The method 300 may be performed by a computing device, such as a computing device described in FIG. 1. Other computing devices may also be used to execute method 300. Method 300 may be implemented in the form of executable instructions stored on a machine-readable storage medium, such as the storage medium 130, and/or in the form of electronic circuitry.

A web page is received that includes application instructions for modifying objects included in the web page (302). For example, a web page manipulator may receive an HTML web page document that includes javascript code for modifying the HTML of the web page.

The application instructions are executed (304). For example, the web page manipulator may load the web page and execute the application instructions using a headless browser or other web browser.

During execution of the application instructions and at a first state of the web page, input is received that causes a change to at least one of an application object or a web page object (306). For example, the first state of the web page may be the initial state the web page is in after the web page and application has loaded in a browser and is ready to receive input. The input may take a variety of forms, such as a user interaction with a button on the web page, textual input into a field of the web page, logging into the web page, etc. The change or changes that occur may also vary, including changes to the web page DOM and/or changes to various application objects.

Change data for the change caused by the received input is recorded in an ordered list of changes (308). For example, in a situation where a user interaction with a button causes a change to an application object, the change may be recorded in an ordered list of changes. Other changes caused by the received input may also be recorded in the ordered list of changes, e.g., in the order that they occur.

A request is received to change a current state of the web page to the first state of the web page (310). For example, a user that is testing the web page may, after interacting with the button on the web page, wish to go back to the state the web page was in prior to the interaction with the button, e.g., to interact with a different button or provide other input.

The inverse of the change caused by the received input is applied to place the web page at the first state (312). For example, in a situation where interaction with a button caused the creation of a DOM object, that DOM object that was created may be deleted/destroyed in order to place the web page back at the first state. Any other changes that occurred as a result of the interaction with the button would also be inversely applied in reverse order.

In some implementations, a second request may be received to change the first state of the web page to the current state. In this situation, the change caused by the input received during execution of the application instructions at the first state would be re-applied. E.g., a web page manipulator may simulate a user interaction with the button, causing the web page state to change back to the current state.

Figure 4:
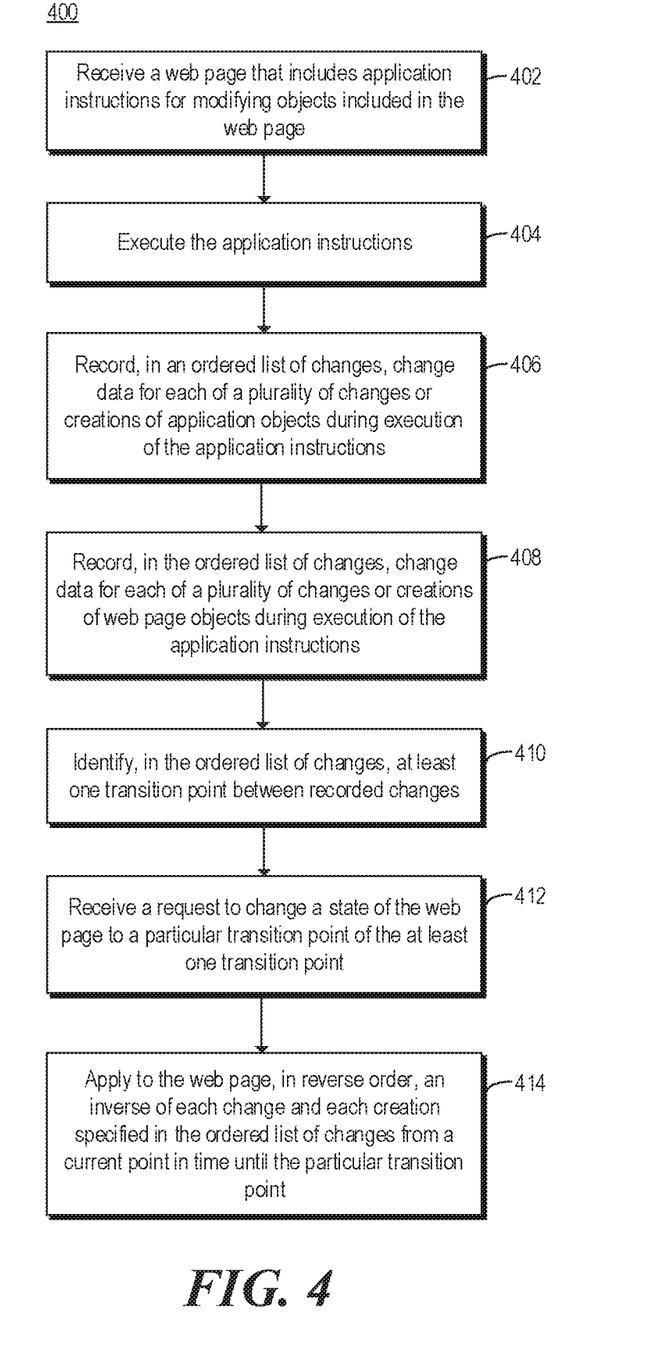
FIG. 4 is a flowchart of an example method for web page manipulation.

FIG. 4 is a flowchart of an example method 400 for web page manipulation. The method 400 may be performed by a computing device, such as a computing device described in FIG. 1. Other computing devices may also be used to execute method 400. Method 400 may be implemented in the form of executable instructions stored on a machine-readable storage medium, such as the storage medium 130, and/or in the form of electronic circuitry.

A web page is received that includes instructions for modifying objects included in the web page (402). For example, a web page manipulator may request a web page from a particular web server, and the web page may include application instructions, e.g., a single page application.

The application instructions are executed (404). For example, a user operating the web page manipulator may cause execution of the application instructions by loading the web page in a web browser. In some implementations, the web page manipulator may identify web page objects defined in the web page DOM as well as application objects defined by the application instructions. The objects may be tagged for tracking.

Change data for each of a plurality of changes or creations of application objects is recorded in an ordered list of changes during execution of the application instructions (406). For example, the initial loading of the web page may involve multiple changes to application objects, and each of these changes may be recorded in the ordered list of changes. Additional changes that occur, e.g., in response to user input with the web page or application, may also be recorded.

Change data for each of a plurality of changes or creations of web page objects is recorded in the ordered list of changes during execution of the application instructions (408). For example, the initial loading of the web page may involve multiple changes to web objects, and each of these changes may be recorded in the ordered list of changes. As with application object changes, additional changes that occur, e.g., in response to user input with the web page or application, may also be recorded. In some implementations, the change data includes object identifiers, new values for objects that were created or modified, and old values for objects that were destroyed or modified.

In the ordered list of changes, at least one transition point is identified between recorded changes (410). Transition points may be identified in a variety of ways. For example, a transition point may be created periodically between a certain number of changes or after a particular period of time passes. Particular events, such as receiving user input, may also trigger the identification/creation of a transition point. For example, when the web page is in an idle state, e.g., after the initial load or after input is finished processing and output has been provided, a transition point may be identified.

A request is received to change a state of the web page to a particular transition point of the at least one transition point (412). For example, a web page tester operating the web page manipulator may wish to transition the web page from a current state to a particular transition point and send the request to the web page manipulator. E.g., after testing one particular type of input, the tester may wish to revert any changes caused by that particular type of input and try another type.

In reverse order, an inverse of each change and each creation specified in the ordered list of changes from a current point in time until the particular transition point are applied to the web page (414). For example, if two objects were modified, two objects were created, and two objects were destroyed from the particular transition point to get to the current point in time, applying the inverse of those changes—e.g., reverting the modifications, destroying objects that were created, and re-creating the objects that were destroyed, would place the web page back at the particular transition point.

In some implementations, a request may be received to change the web page to a second transition point of the at least one transition, the second transition being listed after a current point in the ordered list of changes. In this situation, each change specified in the ordered list of changes may be applied, in order, from the current point in the ordered list of changes to the second transition point (416). In this manner, the web page changes may be forward-applied, allowing a user or test script to transition the web page through various branching states of the web page with a single command that may cause both reverse-order inverse changes and in-order changes.

While the methods 300 and 400 are described with respect to a single computing device, various portions of the methods may be performed by other computing devices. For example, one computing device may be responsible for tracking object changes in an ordered list of changes while another computing device is responsible for receiving requests to change the state of the web page and applying the changes to transition to the requested state.

The foregoing disclosure describes a number of example implementations for manipulating web pages. As detailed above, examples provide a mechanism for tracking changes to web page objects and application objects and using the tracked changes to transition the web page between states.

We claim:

1. A non-transitory machine-readable storage medium encoded with instructions that upon execution by a computing device cause the computing device to:
    receive a web page that includes application instructions for modifying objects included in the web page;
    execute the application instructions;
    record, in an ordered list of changes, change data for each application object that is modified, created, or destroyed during execution of the application instructions, the application object defined by the application instructions;
    record, in the ordered list of changes, change data for each web page object that is modified, created, or destroyed during execution of the application instructions, the web page object defined by a document object model (DOM) of the web page;
    identify, in the ordered list of changes, a transition point between recorded changes;
    receive a request to change a state of the web page to the transition point between recorded changes; and
    apply, in reverse order, an inverse of each change specified in the ordered list of changes from a current point in time until the transition point between recorded changes.

2. The storage medium of claim 1, wherein the application instructions comprise application script, and wherein each application object is an object defined by the application script.

3. The storage medium of claim 1, wherein:
    the change data for each web page object includes i) a web page object identifier, ii) a new value for a web page object that was created or modified, and iii) an old value for a web page object that was modified or destroyed, and
    the change data for each application object includes i) an application object identifier, ii) a new value for an application object that was created or modified, and iii) an old value for an application object that was modified or destroyed.

4. The storage medium of claim 1, wherein each transition point between recorded changes is identified based on at least one of an application object change and web page object change.

5. The storage medium of claim 1, wherein the instructions further cause the computing device to:
    receive a request to change the web page to a second transition point between recorded changes, the second transition point between recorded changes being listed after a current point in the ordered list of changes; and apply, in order, each change specified in the ordered list of changes from the current point in the ordered list of changes to the second transition point between recorded changes.

6. The storage medium of claim 1, wherein the instructions further cause the computing device to:
identify web page objects by tagging the web page objects; and
identify application objects by tagging the application objects.

7. The storage medium of claim 1, wherein the ordered list of changes is represented by a tree representation including nodes that represent states of the web page responsive to changes to the application objects and the web page objects, and links between the nodes, the links between the nodes representing transitions between the states of the web page.

8. A method for application manipulation, implemented using a hardware processor, the method comprising:
receiving a web page that includes application instructions for modifying objects included in the web page;
executing the application instructions;
receiving, during execution of the application instructions and at a first state of the web page, input that causes a change to an application object defined by the application instructions;
recording, in an ordered list of changes, change data for the change to the application object caused by the received input;
receiving a request to change a current state of the web page to the first state of the web page; and
applying an inverse of the change to the application object caused by the received input to place the web page at the first state.

9. The method of claim 8, wherein the application instructions comprise an application script, and wherein the application object is defined by the application script.

10. The method of claim 8, further comprising:
receiving, during the execution of the application instructions, a further input that causes a change to a web page object defined by a document object model (DOM) of the web page;
recording, in the ordered list of changes, change data for the change to the web page object; and
in response to the request, applying an inverse of the change to the web page object to place the web page at the first state.

11. The method of claim 10, wherein:
the change data for the web page object includes i) a web page object identifier, ii) a new value for a web page object that was created or modified, and iii) an old value for a web page object that was modified or destroyed, and
the change data for the application object includes i) an application object identifier, ii) a new value for an application object that was created or modified, and iii) an old value for an application object that was modified or destroyed.

12. The method of claim 8, further comprising:
after applying the inverse of the change to the application object, receiving a request to change the first state of the web page to the current state; and
re-applying the change caused by the input received during execution of the application instructions at the first state.

13. The method of claim 8, further comprising:
identifying, by a web page manipulator executed on the hardware processor, web page objects by tagging the web page objects specified by a document object model (DOM) of the web page; and
identifying, by the web page manipulator, application objects by the tagging the application objects.

14. The method of claim 8, wherein the ordered list of changes is represented by a tree representation including nodes that represent states of the web page responsive to changes to application objects and web page objects, and links between the nodes, the links representing transitions between the states of the web page.

15. A computing device comprising:
a hardware processor; and
a data storage device storing instructions executable on the hardware processor to:
receive a web page that includes application instructions for modifying objects included in the web page;
execute the application instructions;
record, in an ordered list of changes, change data for each of a plurality of modifications, creations, or destructions of application objects during execution of the application instructions, the application objects defined by the application instructions;
record, in the ordered list of changes, change data for each of a plurality of modifications, creations, or destructions of web page objects during execution of the application instructions, the web page objects defined by a document object model (DOM) of the web page;
identify, in the ordered list of changes, at least one transition point between recorded changes;
receive a request to change a state of the web page to a particular transition point of the at least one transition point between recorded changes; and
apply to the web page, in reverse order, an inverse of each change specified in the ordered list of changes from a current point in time until the particular transition point.

16. The computing device of claim 15, wherein the application instructions comprise an application script, and wherein each application object is an object defined by the application script.

17. The computing device of claim 15, wherein:
the change data for each web page object includes i) a web page object identifier, ii) a new value for a web page object that was created or modified, and iii) an old value for a web page object that was modified or destroyed, and
the change data for each application object includes i) an application object identifier, ii) a new value for an application object that was created or modified, and iii) an old value for an application object that was modified or destroyed.

18. The computing device of claim 15, wherein each of the at least one transition point between recorded changes is identified based on at least one of an application object change and web page object change.

19. The computing device of claim 15, wherein the instructions are executable on the hardware processor to:
receive a request to change the web page to a second transition point of the at least one transition point between recorded changes, the second transition point being listed after a current point in the ordered list of changes; and
apply, in order, each change and each creation specified in the ordered list of changes from the current point in the ordered list of changes to the second transition point.

20. The computing device of claim 15, wherein the instructions are executable on the hardware processor to:
  identify web page objects are identified by tagging the web page objects; and
  identify application objects by tagging the application objects.

* * * * *